United States Patent
Yamamoto et al.

(10) Patent No.: US 12,145,526 B2
(45) Date of Patent: Nov. 19, 2024

(54) IN-SEAT AIRBAG DEVICE

(71) Applicant: TOYOTA JIDOSHA KABUSHIKI KAISHA, Toyota (JP)

(72) Inventors: Takeshi Yamamoto, Toki (JP); Mitsuyoshi Ohno, Miyoshi (JP); Toshiki Iwama, Toyota (JP); Yoshito Kusuhara, Okazaki (JP); Masashi Hotta, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/122,788

(22) Filed: Mar. 17, 2023

(65) Prior Publication Data

US 2023/0303027 A1    Sep. 28, 2023

(30) Foreign Application Priority Data

Mar. 23, 2022    (JP) .................................. 2022-047450

(51) Int. Cl.
B60R 21/231    (2011.01)
B60R 21/00    (2006.01)
B60R 21/2338    (2011.01)

(52) U.S. Cl.
CPC .... B60R 21/23138 (2013.01); B60R 21/2338 (2013.01); *B60R 2021/0039* (2013.01); *B60R 2021/23146* (2013.01)

(58) Field of Classification Search
CPC .... B60R 21/23138; B60R 2021/23146; B60R 2021/0039; B60R 21/2338; B60R 21/16; B60R 21/231; B60R 21/23146; B60R 21/207; B60R 21/233; B60R 2021/23386
See application file for complete search history.

(56) References Cited

U.S. PATENT DOCUMENTS

| 2006/0131847 | A1 | 6/2006 | Sato et al. |
| 2018/0229681 | A1* | 8/2018 | Jaradi .................. B60R 21/2165 |
| 2018/0326938 | A1* | 11/2018 | Rickenbach ........ B60R 21/2338 |
| 2019/0161048 | A1* | 5/2019 | Thomas ................ B60R 21/264 |
| 2021/0362670 | A1* | 11/2021 | Hwangbo ............... B60R 21/26 |

FOREIGN PATENT DOCUMENTS

| JP | 2006-008105 A | 1/2006 |
| JP | 2017-197004 A | 11/2017 |
| JP | 2019-137307 A | 8/2019 |
| WO | 2019/166268 A1 | 9/2019 |
| WO | 2023/282018 A1 | 1/2023 |

* cited by examiner

*Primary Examiner* — Jason D Shanske
*Assistant Examiner* — Scott Lawrence Strickler
(74) *Attorney, Agent, or Firm* — Dinsmore & Shohl LLP

(57) ABSTRACT

An in-seat airbag device, includes: an airbag main body having a front-rear chamber that, expands past one side of a head of a passenger toward a seat front side and is disposed at the one side of the head of the passenger, a left-right chamber that expands from a seat front side end portion of the front-rear chamber toward a seat width direction inner side and is disposed at a seat front side of a face of the passenger, and a distal end chamber that expands from a seat width direction inner side end portion of the left-right chamber toward a seat rear side and is disposed at another side of the head of the passenger, wherein the airbag main body is structured such that, in a state in which expansion is completed, the left-right chamber has a curved shape as seen in plan view.

13 Claims, 14 Drawing Sheets

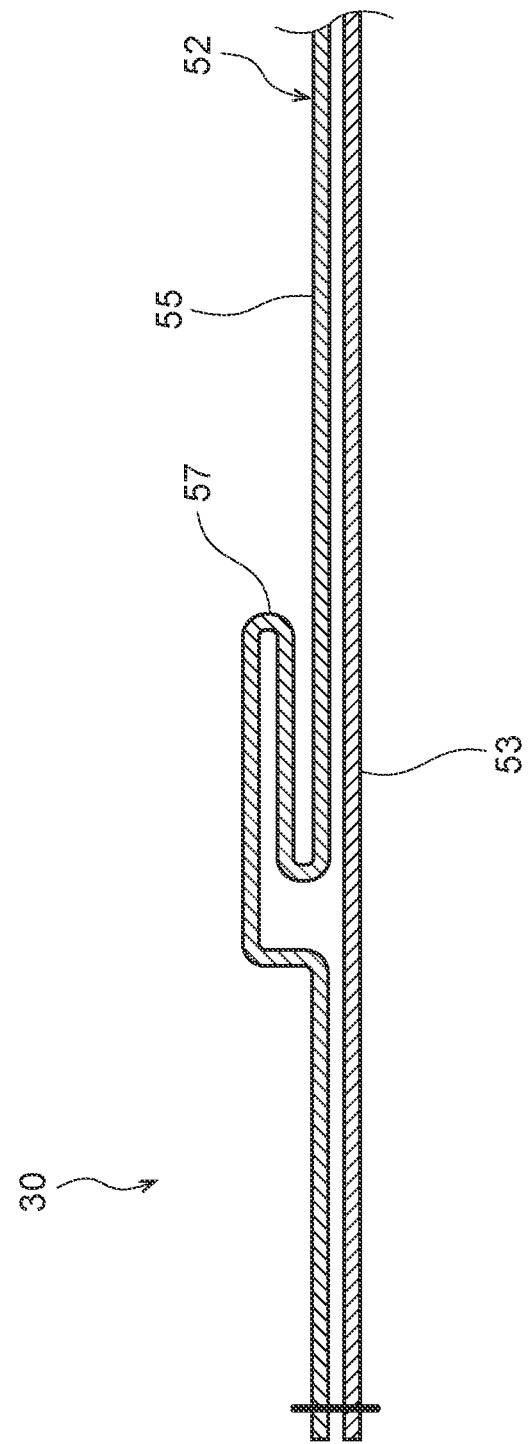

IN-SEAT AIRBAG DEVICE

CROSS-REFERENCE TO RELATED APPLICATION

This application is based on and claims priority under 35 USC 119 from Japanese Patent Application No. 2022-047450 filed on Mar. 23, 2022, the disclosure of which is incorporated by reference herein.

BACKGROUND

Technical Field

The present disclosure relates to an in-seat airbag device.

Related Art

There is conventionally known a side airbag device having: an airbag main body portion that, at the time of a collision from an obliquely front side of a vehicle, expands frontward from one side portion of a seatback and is disposed at a side of the upper half (including the head) of the passenger; and an airbag protruding portion that expands from this airbag main body portion toward the seat width direction inner side and is disposed in front of the face of the passenger, wherein these both portions are joined together by a planar tether (see, for example, Japanese Patent Application Laid-Open (JP-A) No. 2006-008105).

However, in an in-seat airbag device that expands at one side and expands from the rear of the head of the passenger and is disposed in front of the face, as seen in plan view, the supporting point of the rear side of the airbag main body shifts toward the seat width direction outer side with respect to the point of load input from the head of the passenger. Therefore, in the midst of restraining the head of the passenger in the latter half of the collision, a rotation moment, which rotates around this supporting point at the rear side in a direction of moving away from the head of the passenger, is generated with respect to the airbag main body, and there is the concern that the head of the passenger will slip out from the airbag main body.

As a countermeasure thereto, a structure has been conceived of in which, as seen in plan view, a distal end chamber of the airbag main body, which is disposed at the front side of the face of the passenger, is disposed at an acute angle with respect to a front-rear chamber of the airbag main body that is disposed at a side of the head of the passenger, and a cancelling moment is applied to the airbag main body. However, if the distal end chamber of the airbag main body is bent at an acute angle with respect to the front-rear chamber, there are the concerns that gas will not flow smoothly from the front-rear chamber to the distal end chamber, and the expansion of the distal end chamber will be late, and the head of the passenger will not be able to be restrained effectively.

SUMMARY

The present disclosure provides an in-seat airbag device that can make gas flow smoothly from a front-rear chamber to a distal end chamber of an airbag main body.

An in-seat airbag device of a first aspect relating to the present disclosure has: an airbag main body having a front-rear chamber that, due to gas jetted from an inflator that operates due to a collision of a vehicle being detected or predicted, expands past one side of a head of a passenger toward a seat front side and is disposed at the one side of the head of the passenger, a left-right chamber that expands from a seat front side end portion of the front-rear chamber toward a seat width direction inner side and is disposed at a seat front side of a face of the passenger, and a distal end chamber that expands from a seat width direction inner side end portion of the left-right chamber toward a seat rear side and is disposed at another side of the head of the passenger, wherein the airbag main body is structured such that, in a state in which expansion is completed, the left-right chamber has a curved shape as seen in plan view.

In accordance with the disclosure of the first aspect, when a collision of the vehicle is detected or predicted, the inflator operates and jets-out gas. The front-rear chamber expands past a side of the head of the passenger toward a seat front side and is disposed at the side of the head of the passenger. The left-right chamber expands from the seat front side end portion of the front-rear chamber toward a seat width direction inner side and is disposed at the seat front side of the face of the passenger. Further, the distal end chamber expands from a seat width direction inner side end portion of the left-right chamber toward the seat rear side and is disposed at another side of the head of the passenger. Here, the airbag main body is structured such that, in the state in which expansion is completed, the left-right chamber has a curved shape as seen in plan view. Accordingly, gas is made to flow smoothly from the front-rear chamber via the left-right chamber to the distal end chamber of the airbag main body, as compared with a case in which the left-right chamber is structured so as to be a curved shape of an acute angle as seen in plan view.

Further, an in-seat airbag device according to a second aspect of the present disclosure is the in-seat airbag device according to the first aspect of the present disclosure, wherein the airbag main body has an upper surface tether that joins an expansion direction intermediate portion at an upper end portion of the front-rear chamber and an expansion direction intermediate portion at an upper end portion of the distal end chamber, and that covers an upper portion of a space surrounded by the front-rear chamber, the left-right chamber and the distal end chamber, and a lower surface tether that joins an expansion direction intermediate portion at a lower end portion of the front-rear chamber and an expansion direction intermediate portion at a lower end portion of the distal end chamber, and that covers a lower portion of the space surrounded by the front-rear chamber, the left-right chamber and the distal end chamber, wherein the left-right chamber has a curved shape as seen in plan view in the state in which expansion of the airbag main body is completed, due to the upper surface tether being sewn to the upper end portion of the front-rear chamber, an upper end portion of the left-right chamber and the upper end portion of the distal end chamber, and the lower surface tether being sewn to the lower end portion of the front-rear chamber, a lower end portion of the left-right chamber and the lower end portion of the distal end chamber.

In accordance with the disclosure of the second aspect, the upper surface tether joins the expansion direction intermediate portion at the upper end portion of the front-rear chamber and the expansion direction intermediate portion at the upper end portion of the distal end chamber, and covers the upper portion of the space surrounded by the front-rear chamber, the left-right chamber and the distal end chamber. The lower surface tether joins the expansion direction intermediate portion at the lower end portion of the front-rear chamber and the expansion direction intermediate portion at the lower end portion of the distal end chamber, and covers the lower portion of the space surrounded by the front-rear chamber, the left-right chamber and the distal end chamber. Further, the upper surface tether is sewn to the upper end portion of the front-rear chamber, the upper end portion of the left-right chamber and the upper end portion of the distal end chamber, and the lower surface tether is sewn to the lower end portion of the front-rear chamber, the lower end portion of the left-right chamber and the lower end portion of the distal end chamber. Due to this upper surface tether and lower surface tether, in the state in which expansion of the airbag main body is completed, the left-right chamber has a curved shape as seen in plan view. Accordingly, the left-right chamber is easily formed in a curved shape as seen in plan view.

Further, an in-seat airbag device according to a third aspect of the present disclosure is the in-seat airbag device according to the second aspect of the present disclosure, wherein, as seen in a bottom view, a seat rear side end portion of the lower surface tether is cut-out such that a surface area of the lower surface tether is smaller than a surface area of the upper surface tether.

In accordance with the disclosure of the third aspect, as seen in a bottom view, the seat rear side end portion of the lower surface tether is cut-out such that the surface area of the lower surface tether is smaller than the surface area of the upper surface tether. Accordingly, at the time of restraining the head of the passenger, the load to the neck of the passenger that is due to the lower surface tether contacting the neck of the passenger is reduced as compared with a case in which the seat rear side end portion of the lower surface tether is not cut-out.

Further, an in-seat airbag device according to a fourth aspect of the present disclosure is the in-seat airbag device according to the second aspect of the present disclosure, wherein the lower surface tether is a tether chamber that expands due to gas jetted from the inflator.

In accordance with the disclosure of the fourth aspect, the lower surface tether is a tether chamber that expands due to gas jetted from the inflator. Accordingly, at the time of restraining the head of the passenger, the load to the neck of the passenger that is due to the lower surface tether contacting the neck of the passenger is reduced as compared with a case in which the lower surface tether is not made to be a tether chamber.

Further, an in-seat airbag device according to a fifth aspect of the present disclosure is the in-seat airbag device according to any one of the first aspect to the fourth aspect of the present disclosure, wherein, as seen in plan view, a boundary portion between the left-right chamber and the distal end chamber is positioned on an imaginary straight line that passes through a center of gravity of the head of the passenger and runs along a seat front-rear direction.

In accordance with the disclosure of the fifth aspect, as seen in plan view, the boundary portion between the left-right chamber and the distal end chamber is positioned on an imaginary straight line that passes through the center of gravity of the head of the passenger and runs along the seat front-rear direction. Accordingly, while a delay in expansion of the distal end chamber is suppressed, the head of the passenger slipping-out from the airbag main body at the time of restraining the head of the passenger is suppressed.

Further, an in-seat airbag device according to a sixth aspect of the present disclosure is the in-seat airbag device according to any one of the first aspect to the fifth aspect of the present disclosure, wherein, as seen in plan view, a supporting point at a seat side that supports the airbag main body is positioned on an imaginary straight line that passes through a center of gravity of the head of the passenger and runs along a seat front-rear direction.

In accordance with the disclosure of the sixth aspect, as seen in plan view, the supporting point at the seat side that supports the airbag main body is positioned on an imaginary straight line that passes through the center of gravity of the head of the passenger and runs along the seat front-rear direction. Accordingly, the offset (distance) in the seat width direction between the supporting point of the airbag main body and the load input point of the input of load to the airbag main body by the head of the passenger is small. At the time of restraining the head of the passenger, generation of a rotation moment, which rotates in a direction of moving away from the head of the passenger, at the airbag main body is suppressed, and the head of the passenger slipping-out from the airbag main body is suppressed.

Further, an in-seat airbag device according to a seventh aspect of the present disclosure is the in-seat airbag device according to the sixth aspect of the present disclosure, including a joining member that, as seen in plan view, extends in a seat width direction and joins a seat rear side end portion of the front-rear chamber and the supporting point at the seat side that supports the airbag main body.

In accordance with the disclosure of the seventh aspect, the joining member that extends in the seat width direction as seen in plan view joins the seat rear side end portion of the front-rear chamber and the supporting point at the seat side that supports the airbag main body. Accordingly, even though the headrest exists, it is easy to set the supporting point of the airbag main body without interfering with the headrest.

Further, an in-seat airbag device according to an eighth aspect of the present disclosure is the in-seat airbag device according to the seventh aspect of the present disclosure, wherein: the seat rear side end portion of the front-rear chamber and a jetting port of the inflator are connected by a connecting member, and a length of the connecting member is longer than a length of the joining member.

In accordance with the disclosure of the eighth aspect, the length of the connecting member, which connects the seat rear side end portion of the front-rear chamber and the jetting port of the inflator, is longer than the length of the joining member. Accordingly, the seat rear side end portion of the front-rear chamber, which is connected to the jetting port of the inflator, is prevented from becoming the supporting point of the airbag main body.

Further, an in-seat airbag device according to a ninth aspect of the present disclosure is the in-seat airbag device according to any one of the first aspect to the eighth aspect of the present disclosure, wherein the airbag main body has a surface tether for head restraining that joins a head restraining region at the front-rear chamber and a head restraining region at the distal end chamber, and that is formed of a material that stretches more than a base fabric of the airbag main body.

In accordance with the disclosure of the ninth aspect, the surface tether for head restraining, which connects the head restraining region at the front-rear chamber and the head restraining region at the distal end chamber, is formed of a material that stretches more than the base fabric of the airbag main body. Accordingly, the head of the passenger is held as if the surface tether for head restraining is wound thereon. Due thereto, because the distal end chamber is pulled toward the side of the head of the passenger, the head of the passenger slipping-out from the airbag main body is suppressed more effectively.

Further, an in-seat airbag device according to a tenth aspect of the present disclosure is the in-seat airbag device according to the first aspect of the present disclosure, wherein the airbag main body is structured by an upper surface fabric and a lower surface fabric that are formed in substantial "J" shapes as seen in plan view or as seen in a bottom view, and a side surface fabric whose seat vertical direction both end portions are sewn respectively to a periphery of the upper surface fabric and a periphery of the lower surface fabric.

In accordance with the disclosure of the tenth aspect, the airbag main body is structured by the upper surface fabric and the lower surface fabric that are formed in substantial "J" shapes as seen in plan view or as seen in a bottom view, and the side surface fabric whose seat vertical direction both end portions are sewn respectively to the periphery of the upper surface fabric and the periphery of the lower surface fabric. Namely, the upper surface tether and the lower surface tether are not provided at this airbag main body. Accordingly, at the time of restraining the head of the passenger, there is no load that is applied to the neck of the passenger due to the lower surface tether contacting the neck of the passenger.

Further, an in-seat airbag device of an eleventh aspect relating to the present disclosure has a front-rear chamber that, due to gas jetted from an inflator that operates due to a collision of a vehicle being detected or predicted, expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger, wherein: the airbag main body is structured by an inner side chamber that is contacted by the head of the passenger, and an outer side chamber whose length in an expansion direction is formed to be longer than the inner side chamber and that is provided integrally with an outer side of the inner side chamber, and a surplus length portion that projects-out toward a seat front side is formed at a boundary portion between the front-rear chamber and the distal end chamber at the outer side chamber.

In accordance with the disclosure of the eleventh aspect, when a collision of the vehicle is detected or predicted, the inflator operates and jets-out gas. The front-rear chamber expands past a side of the head of the passenger toward a seat front side, and is disposed at the side of the head of the passenger. The distal end chamber expands from the seat front side end portion of the front-rear chamber toward a seat width direction inner side, and is disposed at the seat front side of the face of the passenger. Here, the airbag main body is structured by the inner side chamber that is contacted by the head of the passenger, and the outer side chamber whose length in an expansion direction is formed to be longer than the inner side chamber and that is provided integrally with the outer side of the inner side chamber. Further, the surplus length portion that projects-out toward the seat front side is formed at the boundary portion between the front-rear chamber and the distal end chamber at the outer side chamber. Accordingly, as compared with a case in which this surplus length portion is not formed, gas is made to flow smoothly from the front-rear chamber to the distal end chamber of the airbag main body. Accordingly, a delay in expansion of the distal end chamber is suppressed, and the head of the passenger is restrained effectively. Further, because the upper surface tether and the lower surface tether are not provided at this airbag main body, at the time of restraining the head of the passenger, there is no load that is applied to the neck of the passenger due to the lower surface tether contacting the neck of the passenger.

As described above, in accordance with the present disclosure, gas can be made to flow smoothly from a front-rear chamber to a distal end chamber of an airbag main body at an in-seat airbag device.

BRIEF DESCRIPTION OF THE DRAWINGS

Exemplary embodiments of the present disclosure will be described in detail based on the following figures, wherein:

FIG. 14 is a plan sectional view illustrating, in a partially enlarged manner, the structure of the airbag main body at the in-seat airbag device relating to the fourth embodiment.

DETAILED DESCRIPTION

Embodiments relating to the present disclosure are described in detail hereinafter on the basis of the drawings. Note that, for convenience of explanation, arrow UP that is shown appropriately in the respective drawings indicates the seat upward direction, arrow FR indicates the seat forward direction, and arrow RH indicates the seat rightward direction. Accordingly, in the following description, when vertical, front-rear and left-right directions are mentioned without being specified, they refer to the vertical, front-rear and left-right of the vehicle seat. Further, the left-right direction has the same meaning as the seat width direction.

Figure 1:
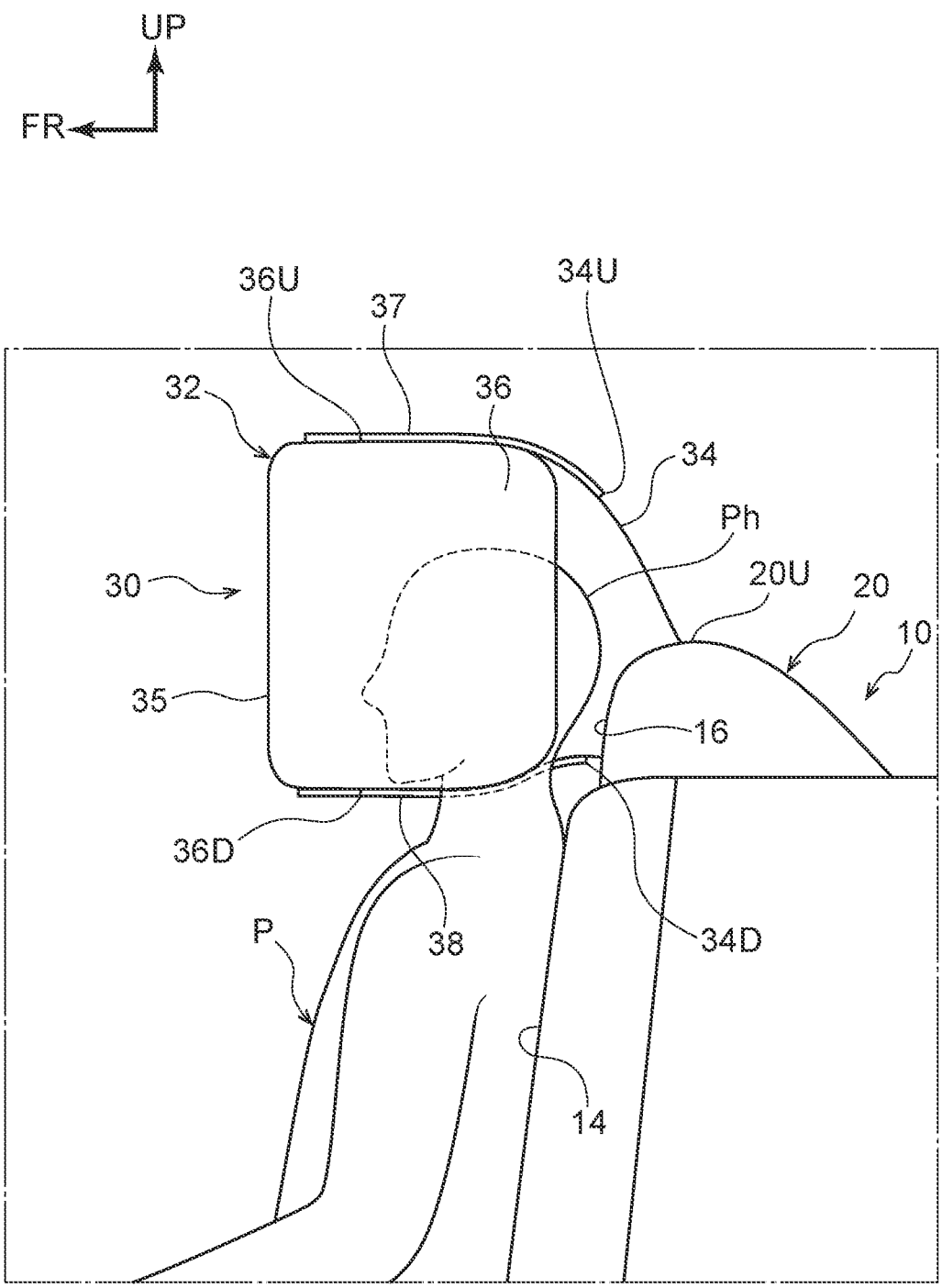
FIG. 1 is a side view illustrating a state after expansion of an in-seat airbag device relating to a first embodiment.
Figure 2:
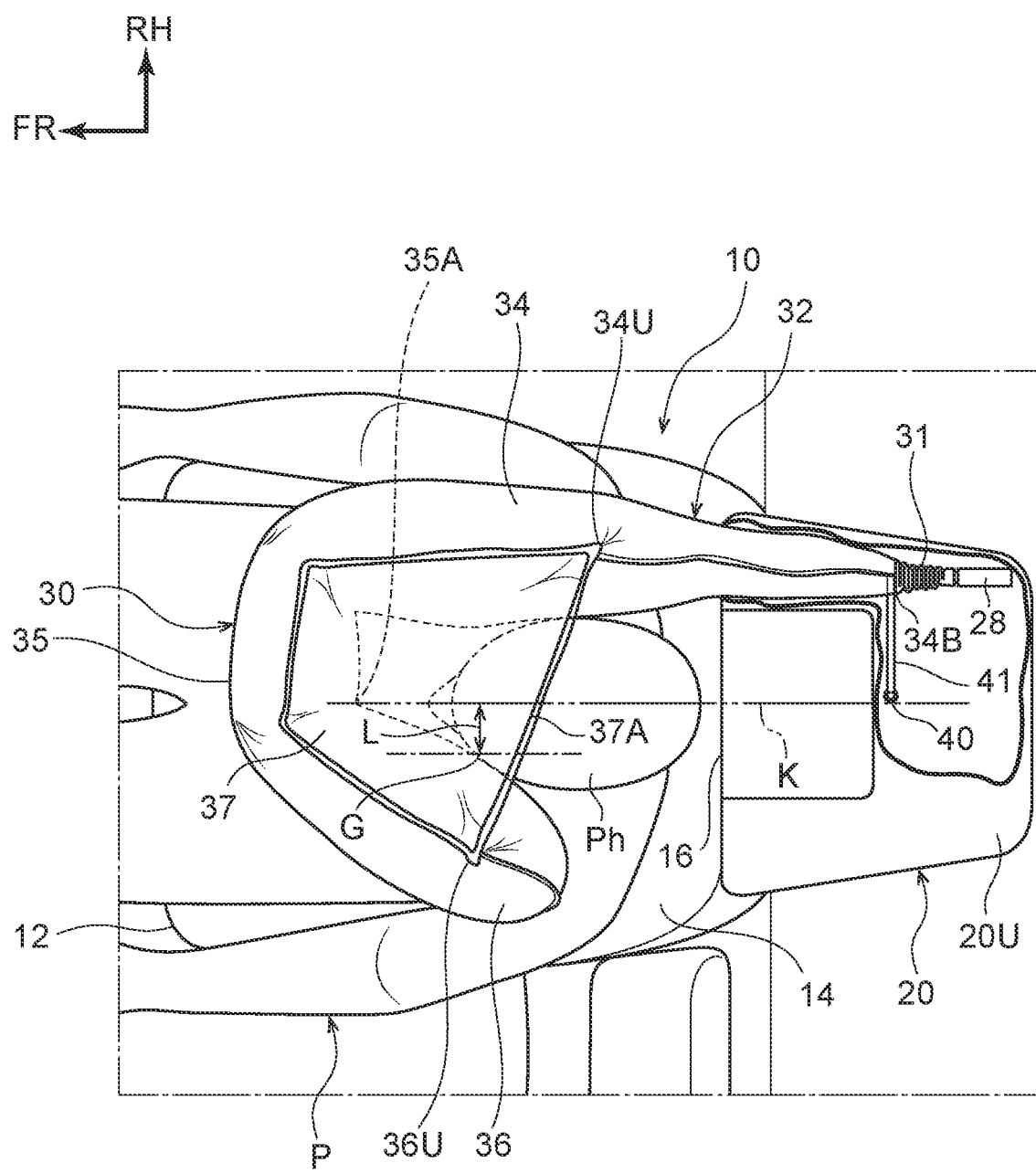
FIG. 2 is a plan view illustrating the state after expansion of the in-seat airbag device relating to the first embodiment.
Figure 3:
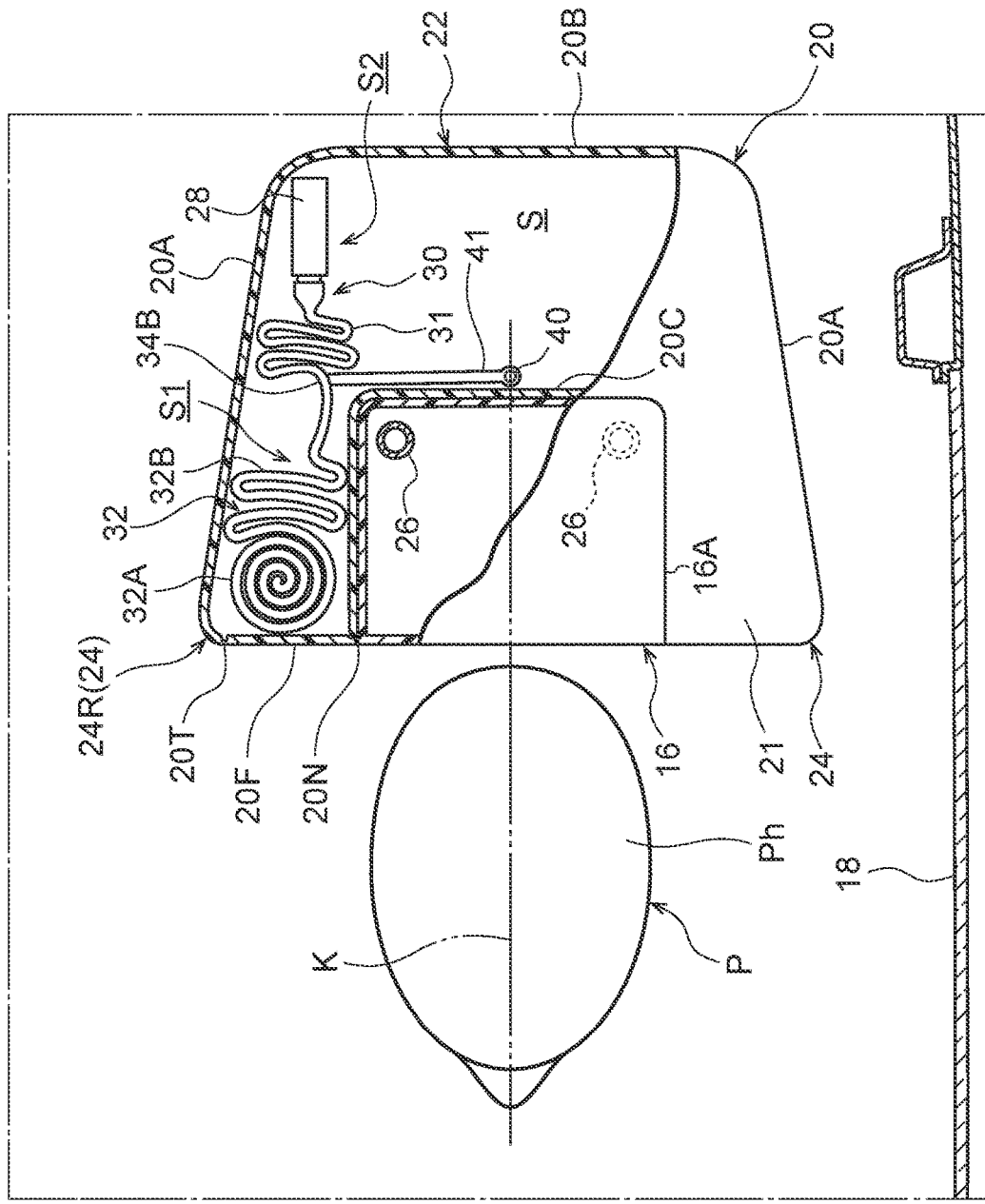
FIG. 3 is an enlarged plan view illustrating, in a partially broken manner, a state before expansion of the in-seat airbag device relating to the first embodiment.

As illustrated in FIG. 1 through FIG. 3, an in-seat airbag device (hereinafter simply called "airbag device") 30 relating to the present embodiment is provided within a case portion 20 that structures a headrest 16 of a vehicle seat 10 that serves as a rear seat of a vehicle. Accordingly, the vehicle seat 10 relating to the present embodiment is described as a rear seat, but the airbag device 30 may be provided at a front seat.

Description is given by using an example of a case in which this rear seat is the rear seat that is at the side of a left side window 18 (see FIG. 3), and an airbag main body 32 expands so as to pass between a head Ph of a passenger P at the side window 18 side and the head of the passenger (not illustrated) at the center seat side, as will be described later. However, the airbag main body 32 may expand so as to pass between the side window 18 and the head Ph of the passenger P. Further, the "passenger P" in the present embodiment is a passenger corresponding to, as an example, an AM50 (50th percentile U.S. adult male) World SID (internationally standardized side crash dummy: World Side Impact Dummy).

First Embodiment

The airbag device 30 relating to the first embodiment is described first. As illustrated in FIG. 1 and FIG. 2, the vehicle seat 10 has a seat cushion 12 on which the passenger P sits (that supports the buttocks and thigh regions of the passenger P), a seatback 14 that supports the back portion of the passenger P, and the headrest 16 that supports the head Ph of the passenger P.

As illustrated in FIG. 3, the headrest 16 has a main body portion 16A that is block-shaped and is provided so as to be able to be raised and lowered at the seat width direction center at the upper end portion of the seatback 14. Specifically, a pair of left and right solid-cylindrical headrest stays (not illustrated) are provided at the seat width direction center of the lower surface of the main body portion 16A.

The respective headrest stays are inserted through headrest supports 26, which are substantially cylindrical and are provided as a left-right pair at the seat width direction center at the upper end portion of the seatback 14, so as to be able to be raised and lowered and so as to be able to be fixed at plural, predetermined positions. Due thereto, the height position of the headrest 16 can be adjusted so as to conform to the position of the head Ph of the passenger P. Further, the headrest 16 has the case portion 20 that is provided so as to be continuous from the rear of the main body portion 16A to over the left and right both sides.

As seen in plan view, the case portion 20 is formed in a substantial "U" shape whose front side is open. The main body portion 16A of the headrest 16 is disposed at the inner side of the case portion 20 substantially without any gaps therebetween. Note that, at the case portion 20, the front end surfaces of left and right side portions 24 that extend in the front-rear direction (i.e., the outer surfaces of front walls 20F) are substantially flush with the front surface of the main body portion 16A.

Further, outer side walls 20A (of the side portions 24) at the left and the right and a rear wall 20B of the case portion 20 are structured by a cover member 22 that is made of resin and is formed in a substantial "U" shape as seen in plan view. Further, an upper wall 20U (see FIG. 1 and FIG. 2), a lower wall (not illustrated), the front walls 20F and an inner peripheral wall 20C, which faces the main body portion 16A, at the case portion 20 are structured to include urethane foam members (not illustrated) of predetermined thicknesses. The cover member 22 and the outer surfaces of the urethane foam members are covered integrally by a skin material 21.

A predetermined space S (including an accommodating portion S1 and a placement portion S2 that are described later) is formed at the interior of the case portion 20. Further, the airbag main body 32 of the airbag device 30 is accommodated in the accommodating portion S1 that is formed within a side portion 24R, which is at the side opposite the side window 18 side (i.e., is at the right side that is the center seat side in the drawings), of the case portion 20. Note that the structure of the airbag main body 32 is described in detail later.

An inflator 28 is disposed in the rear portion side of the space S formed in the case portion 20, and specifically, in the placement portion S2 that is further toward the rear side than the main body portion 16A as seen in a plan view and a side view. The inflator 28 is formed substantially in the shape of a cylinder having a bottom, and the outer peripheral portion of the inflator 28 is supported via a retainer (not illustrated) at a reaction force plate (not illustrated) that is formed in the shape of a housing, such that the axially central portion of the inflator 28 is disposed along the front-rear direction.

The reaction force plate is fixed via a bracket (not illustrated) to the seatback frame (not illustrated) for example, and is structured so as to receive the reaction force that is transmitted via the inflator 28 from the airbag main body 32 that expands toward the front side. Note that the reaction force plate and the retainer are both disposed in the placement portion S2.

The inflator 28 is electrically connected to an airbag ECU (not illustrated) that is provided at the vehicle. The airbag ECU and a detecting device (not illustrated), such as an acceleration sensor or the like provided at the vehicle, are electrically connected. Accordingly, due to a collision of the vehicle being detected by the detecting device, the inflator 28 operates via the airbag ECU, and jets-out gas instantaneously.

Note that the inflator 28 may be a structure that operates due to a collision of the vehicle being predicted by a collision predicting sensor (not illustrated) or the like, and not a structure that operates due to a collision of the vehicle being detected.

The jetting port of the inflator 28 and a rear side end portion 34B of the airbag main body 32 (a front-rear chamber 34) are connected by a connecting member 31. Namely, the rear end portion (one end portion) of the connecting member 31 is connected to the jetting port of the inflator 28, and the front end portion (another end portion) of the connecting member 31 is connected to the rear side end portion 34B of the airbag main body 32 (the front-rear chamber 34).

As illustrated in FIG. 1 and FIG. 2, the airbag device 30 has the airbag main body 32 that, due to gas being jetted from the inflator 28 (see FIG. 3), expands toward the front side from the rear side (in detail, the right rear side) of the head Ph of the passenger P seated in the vehicle seat 10.

The airbag main body 32 has the front-rear chamber 34 that expands past the right side (one side) of the head Ph of the passenger P toward the front side and is disposed at the right side of the head Ph of the passenger P (between the head Ph of the passenger P who is at the side window 18 side and the head of the passenger who is at the center seat side), a left-right chamber 35 that expands from the front side end portion of the front-rear chamber 34 toward the seat width direction inner side and is disposed at the front side of the face of the passenger P, and a distal end chamber 36 that expands from the seat width direction inner side end portion of the left-right chamber 35 toward the rear side and is disposed at the left side (another side) of the head Ph of the passenger P. Namely, this airbag main body 32 is bent substantially in the shape of the letter "J" in a bottom view, and can restrain at least the head Ph of the passenger P.

Figure 4:
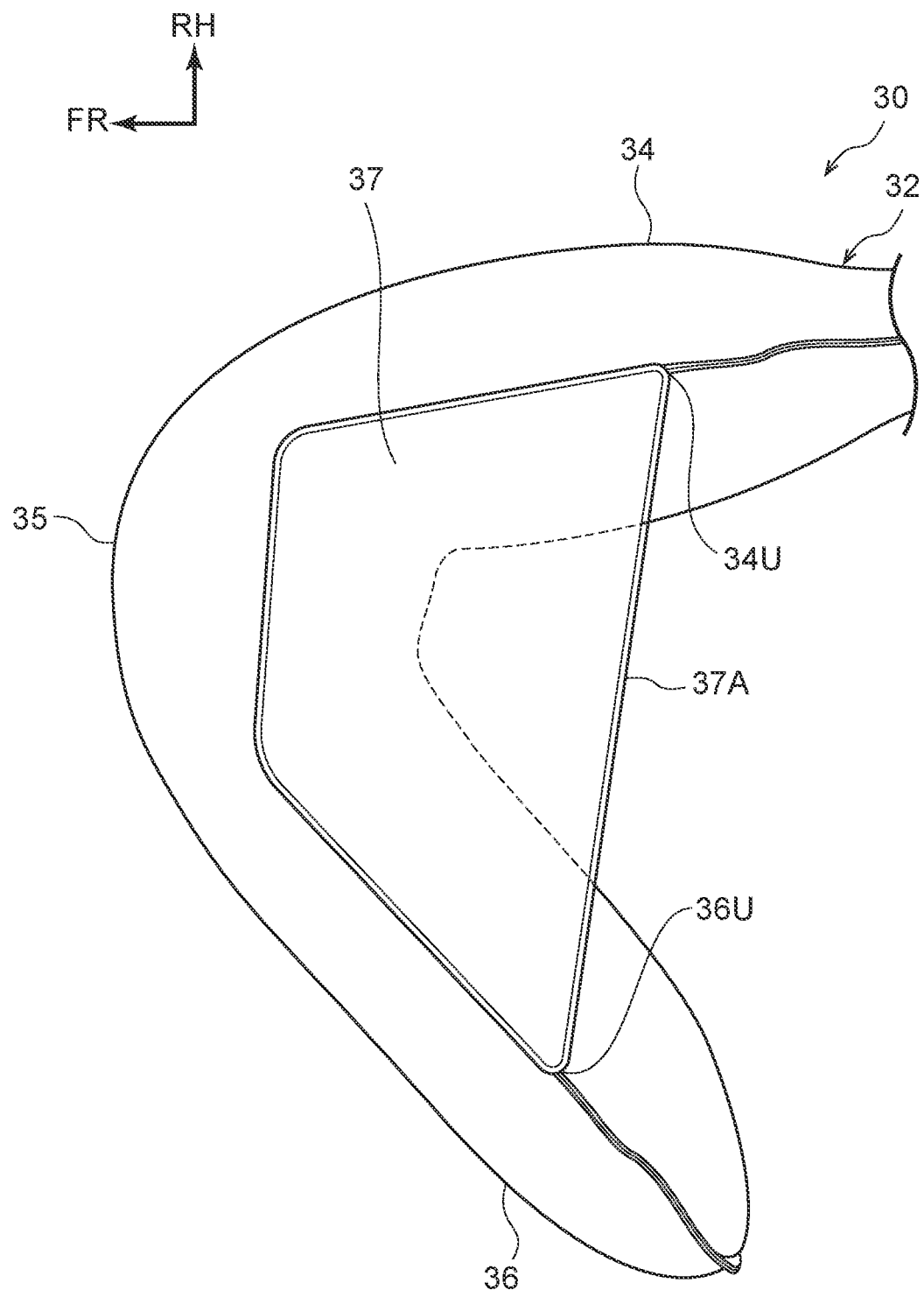
FIG. 4 is an enlarged plan view illustrating a state after expansion of an airbag main body at the in-seat airbag device relating to the first embodiment.
Figure 5:
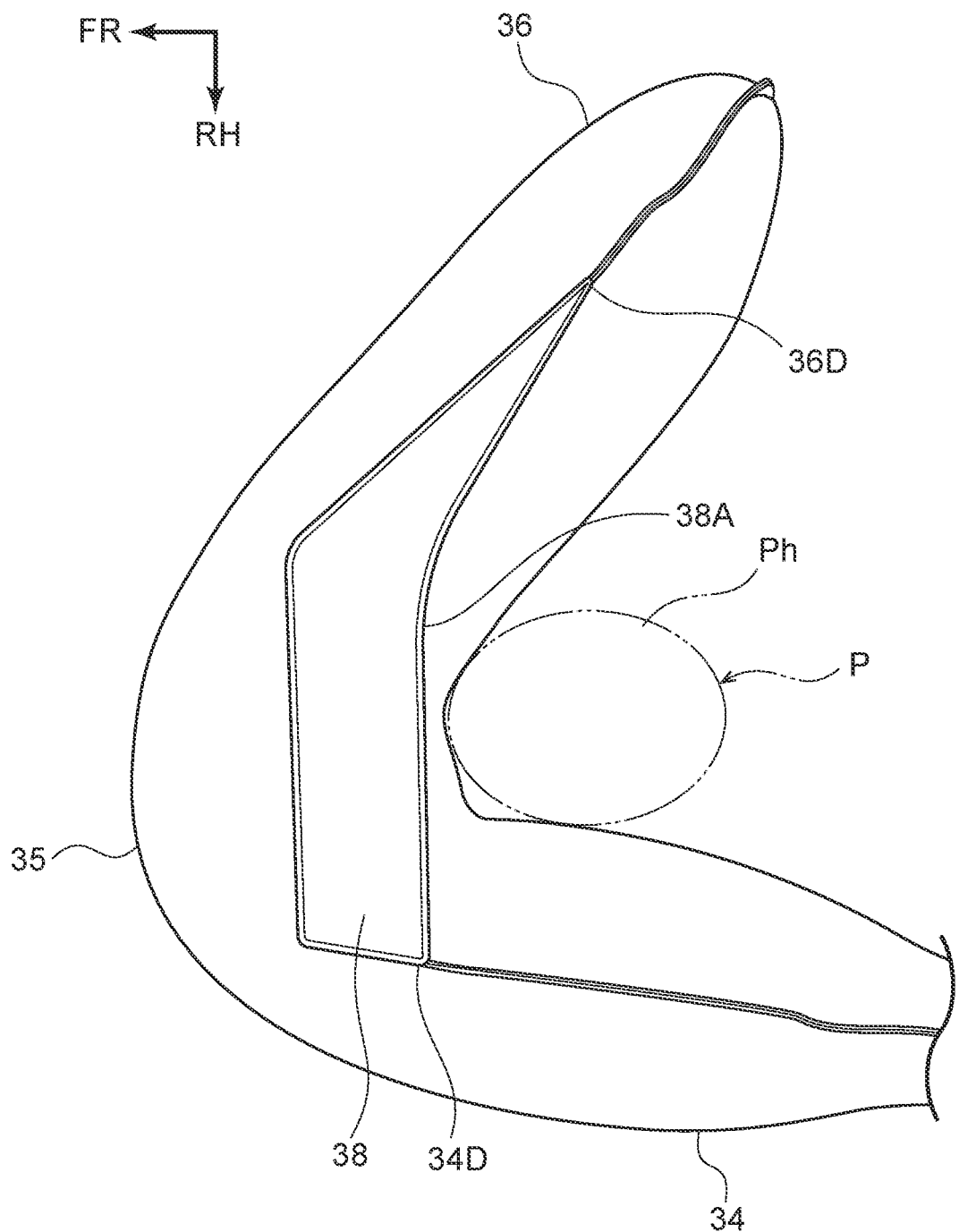
FIG. 5 is an enlarged bottom view illustrating the state after expansion of the airbag main body at the in-seat airbag device relating to the first embodiment.

Further, as illustrated in FIG. 4 and FIG. 5, the airbag main body 32 has an upper surface tether 37 that joins an expansion direction intermediate portion 34U at the upper end portion of the front-rear chamber 34 and an expansion direction intermediate portion 36U at the upper end portion of the distal end chamber 36, and that covers the upper portion of the space surrounded by the front-rear chamber 34, the left-right chamber 35 and the distal end chamber 36, and a lower surface tether 38 that joins an expansion direction intermediate portion 34D at the lower end portion of the front-rear chamber 34 and an expansion direction intermediate portion 36D at the lower end portion of the distal end chamber 36, and that covers the lower portion of the space surrounded by the front-rear chamber 34, the left-right chamber 35 and the distal end chamber 36.

More specifically, as illustrated in FIG. 4, when the airbag main body 32 inflates and expands, as seen in plan view, the upper surface tether 37 forms a substantially trapezoidal shape having a rear end edge portion 37A that is rectilinear and connects the expansion direction intermediate portion 34U at the upper end portion of the front-rear chamber 34 and the expansion direction intermediate portion 36U at the upper end portion of the distal end chamber 36.

Further, the peripheral edge portion of the upper surface tether 37, which is other than the rear end edge portion 37A (the rear side end portion) thereof, is attached by sewing to the upper end portion of the front-rear chamber 34, the upper end portion of the left-right chamber 35 and the upper end portion of the distal end chamber 36, from the expansion direction intermediate portion 34U at the upper end portion of the front-rear chamber 34 via the upper end portion of the left-right chamber 35 to the expansion direction intermediate portion 36U at the upper end portion of the distal end chamber 36.

Similarly, as illustrated in FIG. 5, when the airbag main body 32 inflates and expands, as seen in a bottom view, the lower surface tether 38 forms a substantially trapezoidal shape having a rear end edge portion 38A that is described later and connects the expansion direction intermediate portion 34D (an intermediate portion that is near the left-right chamber 35) at the lower end portion of the front-rear chamber 34 and the expansion direction intermediate portion 36D at the lower end portion of the distal end chamber 36.

Further, the peripheral edge portion of the lower surface tether 38, which is other than the rear end edge portion 38A (the rear side end portion) thereof, is attached by sewing to the lower end portion of the front-rear chamber 34, the lower end portion of the left-right chamber 35 and the lower end portion of the distal end chamber 36, from the expansion direction intermediate portion 34D at the lower end portion of the front-rear chamber 34 via the lower end portion of the left-right chamber 35 to the expansion direction intermediate portion 36D at the lower end portion of the distal end chamber 36.

Due to the upper surface tether 37 and the lower surface tether 38, in the state in which expansion of the airbag main body 32 is completed, the left-right chamber 35 is a curved shape of a small curvature as seen in plan view (is such that an acute-angled shape is not formed thereat). Further, as illustrated in FIG. 5, as seen in a bottom view, the rear side end portion of the lower surface tether 38 is cut-out greatly such that the surface area of the lower surface tether 38 is smaller than that of the upper surface tether 37, and specifically, is a size that is substantially half the size of the upper surface tether 37, and this rear side end portion is the rear end edge portion 38A that does not jut-out toward the passenger P side.

As illustrated in FIG. 2 and FIG. 3, boundary portion 35A between the left-right chamber 35 and the distal end chamber 36 is positioned on imaginary straight line K that, as seen in plan view, passes-through the center of gravity of the head Ph of the passenger P and runs along the front-rear direction. A supporting point 40 at the vehicle seat 10 side that supports the airbag main body 32 also is positioned on this imaginary straight line K. Namely, the supporting point 40 that is positioned on the imaginary straight line K is provided at the rear side of the headrest 16 (the main body portion 16A) within the case portion 20.

Note that, in some embodiments the supporting point 40 may be provided on the imaginary straight line K, the supporting point 40 may be provided at a position at which the offset (distance L, see FIG. 2) in the seat width direction with respect to a load input point G of load to the airbag main body 32 by the head Ph of the passenger P (the contact point where the head Ph of the passenger P contacts the distal end chamber 36) is even smaller.

Further, a case is assumed in which the passenger P is sitting at the seat width direction center of the seat cushion 12 of the vehicle seat 10. Accordingly, the imaginary straight line K can also be called the central line that, as seen in plan view, passes-through the seat width direction center of the vehicle seat 10 and runs along the front-rear direction. Further, due to the upper surface tether 37 and the lower surface tether 38, the angle of inclination of the distal end chamber 36 with respect to the imaginary straight line K as seen in plan view is, for example, 45°.

A pair of upper and lower joining members 41 that join the supporting point 40 and the rear side end portion 34B of the front-rear chamber 34 are provided within the case portion 20. The joining members 41 extend in the seat width direction as seen in plan view. An extending direction one end portion of each joining member 41 is fixed to the supporting point 40, and the extending direction another end portion of each joining member 41 is attached by sewing or the like to the rear side end portion 34B of the front-rear chamber 34 (see FIG. 6).

In this way, the extending direction another end portions of the joining members 41 and the front end portion (the another end portion) of the connecting member 31 are connected to the rear side end portion 34B of the front-rear chamber 34. In the state in which expansion of the airbag main body 32 is completed, the extending directions of the joining members 41 and the extending direction of the connecting member 31 are substantially orthogonal as seen in plan view. Further, the length of the connecting member 31 is longer than the lengths of the joining members 41 (see FIG. 2 and FIG. 3).

Further, as illustrated in FIG. 3, the airbag main body 32 is wound outwardly in the form of a roll whose axial direction is the vertical direction (in a state of having an outwardly-wound portion 32A that is roll-shaped at the seat width direction outer side in plan view), and is accommodated in the accommodating portion S1 formed in the side portion 24R. A bellows portion 32B is formed so as to be continuous with the outwardly-wound portion 32A at the expansion direction upstream side of the outwardly-wound portion 32A.

Namely, the airbag main body 32 is accommodated in the accommodating portion S1 in a state of having the bellows portion 32B which is folded-up in the form of bellows and is continuous with the expansion direction upstream side of the outwardly-wound portion 32A. Accordingly, at the time when the airbag main body 32 expands from the side portion 24R past the right side of the head Ph of the passenger P toward the front side due to the gas jetted from the inflator 28, first, the bellows portion 32B expands while unfolding, and next, the outwardly-wound portion 32A expands while unwinding.

Note that the bellows portion 32B illustrated in FIG. 3 is formed by two groups, when considering one group to be a region that is folded in two. However, the present disclosure is not limited to this. It suffices for the bellows portion 32B to be formed by plural groups, and the bellows portion 32B may be formed by three or more groups.

Further, accompanying the expansion of the airbag main body 32, the front wall 20F that structures the front end surface of the side portion 24R is, together with a portion of the front wall 20F side of the upper wall 20U, ruptured in the form of a straight line that runs in the vertical direction as seen in a front view for example. In some embodiments, the place that ruptures is a seat width direction inner side end portion 20N of the front wall 20F.

If the place that ruptures is the seat width direction inner side end portion 20N of the front wall 20F (e.g., if a weak portion or the like that is easy to rupture is formed at the seat width direction inner side end portion 20N of the front wall 20F), the front wall 20F opens with a seat width direction outer side end portion 20T being a hinge portion.

Operation of the airbag device 30 relating to the first embodiment that is structured as described above is described next.

When the detecting device detects that the vehicle has front-collided, the inflator 28 operates and instantaneously jets gas into the interior of the airbag main body 32. When gas is jetted to the airbag main body 32 interior, due to the expansion of the airbag main body 32 (i.e., by being pushed from the inner side by the airbag main body 32), the front wall 20F of the side portion 24R ruptures together with a portion of the front wall 20F side of the upper wall 20U.

Then, the airbag main body 32 expands from the side portion 24R past the right side of the head Ph of the passenger P (in the gap between the head Ph of the passenger P at the side window 18 side and the head of the passenger at the center seat side) toward the front side. Namely, at the airbag main body 32, first, the bellows portion 32B that is folded-up in a bellows shape expands while unfolding, and next, the outwardly-wound portion 32A that is wound outwardly in the form of a roll expands while unwinding.

Here, it is known that, generally, a bellows-shaped portion comes undone more quickly than a roll-shaped portion (the resistance force at the time of expanding is less at a bellows-shaped portion than at a roll-shaped portion). Accordingly, the airbag main body 32, which has the outwardly-wound portion 32A and the bellows portion 32B in that order from the expansion direction downstream side, can expand toward the front side more quickly than the airbag main body 32 that has only the outwardly-wound portion 32A.

Further, when the front-rear chamber 34 inflates and expands and is disposed at the right side of the head Ph of the passenger P, gas flows into the left-right chamber 35 from the front side end portion of the front-rear chamber 34, and the left-right chamber 35 inflates and expands toward the seat width direction inner side, and is disposed at the front side of the face of the passenger P. Then, further, gas flows into the distal end chamber 36 from the left-right chamber 35, and the distal end chamber 36 expands from the seat width direction inner side end portion of the left-right chamber 35 toward the rear side, and is disposed at the left side of the head Ph of the passenger P.

Here, the airbag main body 32 is structured such that, in the state in which expansion is completed, the left-right chamber 35 is in a curved shape as seen in plan view, due to the upper surface tether 37 and the lower surface tether 38. Accordingly, gas can be made to flow smoothly from the front-rear chamber 34 via the left-right chamber 35 to the distal end chamber 36 of the airbag main body 32, as compared with a case in which the left-right chamber 35 is structured so as to be a curved shape of an acute angle.

Due thereto, a delay in the expansion of the distal end chamber 36 can be suppressed or prevented, and the airbag main body 32 can be expanded as planned. Moreover, as described above, the left-right chamber 35 is a curved shape as seen in plan view due to the upper surface tether 37 and the lower surface tether 38, and therefore, this curved shape can be formed easily.

In this way, at least the head Ph of the passenger P seated in the vehicle seat 10 can be restrained effectively by the airbag main body 32 (the front-rear chamber 34, the left-right chamber 35 and the distal end chamber 36) that has expanded smoothly and as planned. Namely, at least the head Ph of the passenger P moving forward due to inertia can be suppressed effectively by the airbag main body 32.

Note that, as described above, the airbag main body 32 expands toward the front side while the outwardly-wound portion 32A that is wound outwardly unwinds. Therefore, there is no concern that, at the time when the airbag main body 32 expands, the face of the passenger P will be hurt by the airbag main body 32. Moreover, if the front wall 20F is structured so as to be opened with the seat width direction outer side end portion 20T being the hinge portion at the time when the airbag main body 32 expands, the unfolding front wall 20F contacting the head Ph of the passenger P is inhibited by the airbag main body 32.

Further, the lower surface tether 38 is positioned at the neck of the passenger P, and, as seen in a bottom view, the rear side end portion thereof is made to be the cut-out rear end edge portion 38A so that the surface area of the lower surface tether 38 is smaller than that of the upper surface tether 37. Accordingly, as compared with a case in which the rear side end portion of the lower surface tether 38 is not cut-out, at the time of restraining the head when the head Ph of the passenger P who starts to move toward the front side due to inertia is restrained, the lower surface tether 38 either does not interfere with (does not hit) the neck of the passenger P, or, if the lower surface tether 38 does interfere with (does hit) the neck, the load applied to the neck of the passenger P due to contact with the neck of the passenger P can be reduced.

Namely, in accordance with this lower surface tether 38, even at the time when the head Ph of the passenger P moves toward the front side due to inertia and is restrained by the airbag main body 32, the injury value that is imparted to the neck of the passenger P can be reduced. Note that, because the upper surface tether 37 is positioned at the upper side of the head Ph of the passenger P, even at the time when the head Ph of the passenger P moves toward the front side due to inertia and is restrained by the airbag main body 32, the upper surface tether 37 does not interfere with (does not hit) the head Ph of the passenger P.

Further, the boundary portion 35A between the left-right chamber 35 and the distal end chamber 36 is positioned on the imaginary straight line K that, as seen in plan view, passes-through the center of gravity of the head Ph of the passenger P and runs along the front-rear direction. Accordingly, while a delay in expansion of the distal end chamber 36 is suppressed, the head Ph of the passenger P can be restrained more effectively at the time of restraining the head of the passenger P, and the head Ph of the passenger P slipping-out from the airbag main body 32 can be suppressed.

Moreover, the supporting point 40, which is at the vehicle seat 10 side and supports the airbag main body 32, is positioned on the imaginary straight line K that, as seen in plan view, passes-through the center of gravity of the head Ph of the passenger P and runs along the front-rear direction. Accordingly, the offset (distance L) in the seat width direction between the supporting point 40 of the airbag main body 32 and the load input point G of the input of load to the airbag main body 32 by the head Ph of the passenger P can be made to be small. Accordingly, at the time of restraining the head of the passenger P, generation of a rotation moment, which rotates in a direction of moving away from the head Ph of the passenger P, at the airbag main body 32 can be suppressed, and the head Ph of the passenger P slipping-out from the airbag main body 32 can be suppressed.

Further, the joining members 41 that extend in the seat width direction as seen in plan view join the supporting point 40, which supports the airbag main body 32, and the rear side end portion 34B of the front-rear chamber 34. Accordingly, even though the headrest 16 exists, the supporting point 40 of the airbag main body 32 can be set easily without interfering with the headrest 16 (so as to detour around the headrest 16).

The length of the connecting member 31, which connects the rear side end portion 34B of the front-rear chamber 34 and the jetting port of the inflator 28, is set to be longer than the lengths of the joining members 41. Accordingly, the rear side end portion 34B of the front-rear chamber 34, which is connected to the jetting port of the inflator 28, can be prevented from becoming the supporting point 40 of the airbag main body 32.

Modified Example

Figure 6:
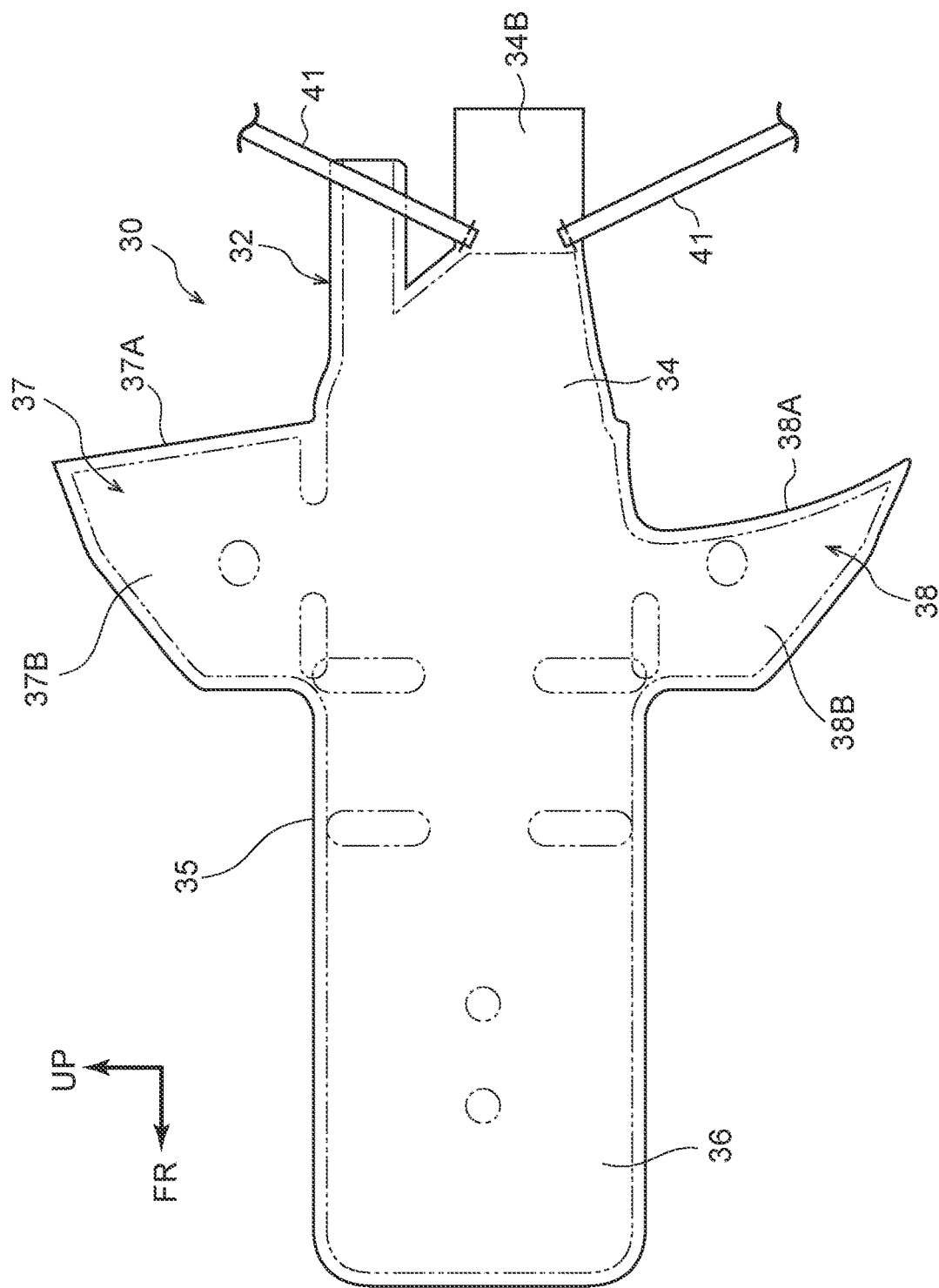
FIG. 6 is a development illustrating a modified example of the airbag main body at the in-seat airbag device relating to the first embodiment.

Note that, as illustrated in FIG. 6, the lower surface tether 38 may be made to be a tether chamber 38B that expands due to gas jetted from the inflator 28. If the lower surface tether 38 is made to be the tether chamber 38B, at the time of restraining the head of the passenger P, the load to the neck of the passenger P that is due to the lower surface tether 38 contacting the neck of the passenger P can be more effectively reduced as compared with a case in which the lower surface tether 38 is not made to be the tether chamber 38B.

Further, in this case, in some embodiments as illustrated in FIG. 6, the lower surface tether 38 is made to be a shape in which the rear side end portion thereof is cut-out (a shape such as the rear end edge portion 38A). In accordance therewith, at the time of restraining the head of the passenger P, the load to the neck of the passenger P that is due to the lower surface tether 38 contacting the neck of the passenger P can be reduced even more, and the injury value imparted to the neck of the passenger P can be reduced even more.

Further, the upper surface tether 37 also may be made to be a tether chamber 37B that expands due to gas jetted from the inflator 28. If the upper surface tether 37 is made to be the tether chamber 37B, at the time of restraining the head of the passenger P, the distal end portion of the distal end chamber 36 can be deformed so as to approach the front-rear chamber 34 side, and therefore, the head Ph of the passenger P slipping-out from the airbag main body 32 can be suppressed more effectively.

Second Embodiment

The airbag device 30 relating to the second embodiment is described next. Note that regions that are equivalent to those of the above-described first embodiment are denoted by the same reference numerals, and detailed description thereof (including description of common operations) is omitted appropriately.

Figure 7:
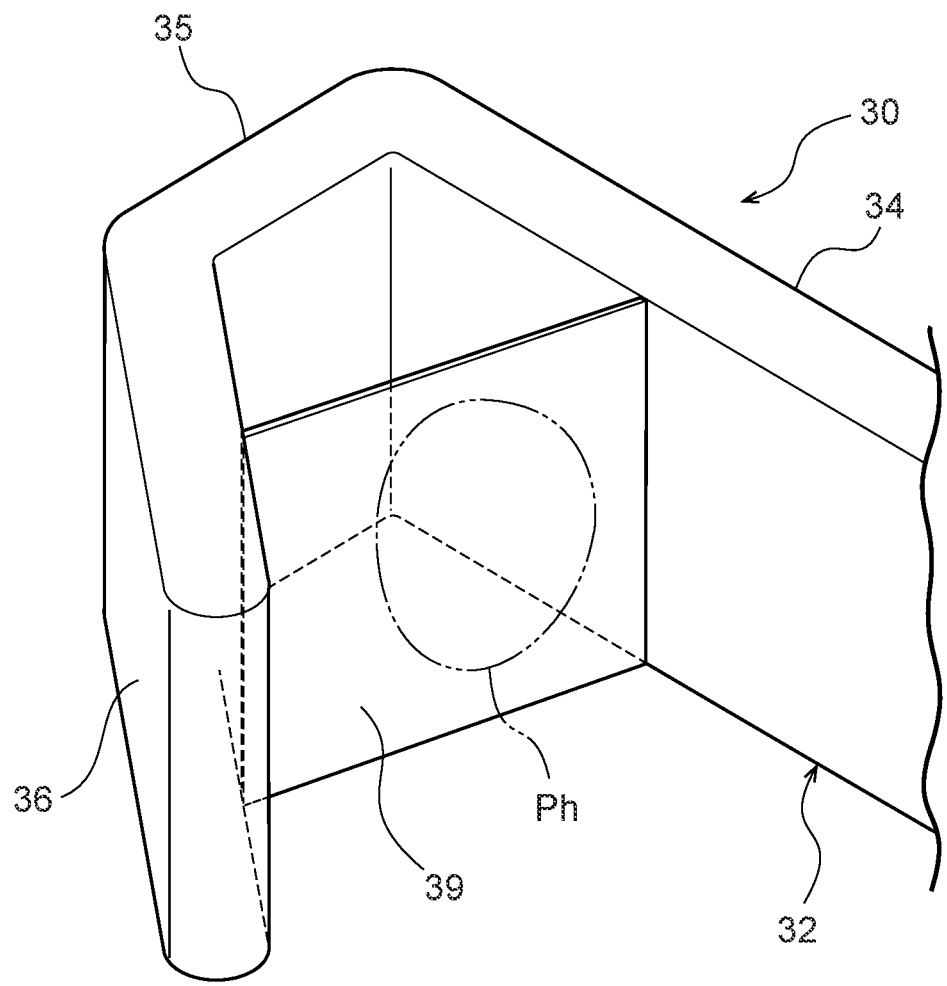
FIG. 7 is a perspective view illustrating a state after expansion of an airbag main body at an in-seat airbag device relating to a second embodiment.

As illustrated in FIG. 7, the airbag main body 32 of the airbag device 30 relating to the second embodiment differs from the above-described first embodiment only with regard to the point that the airbag main body 32 has a surface tether 39 for head restraining that is formed of a material that stretches more than the base fabric of the airbag main body 32 and that joins the head restraining region at the front-rear chamber 34 and the head restraining region at the distal end chamber 36, and the point that the upper surface tether 37 and the lower surface tether 38 are not provided.

Figure 8A:
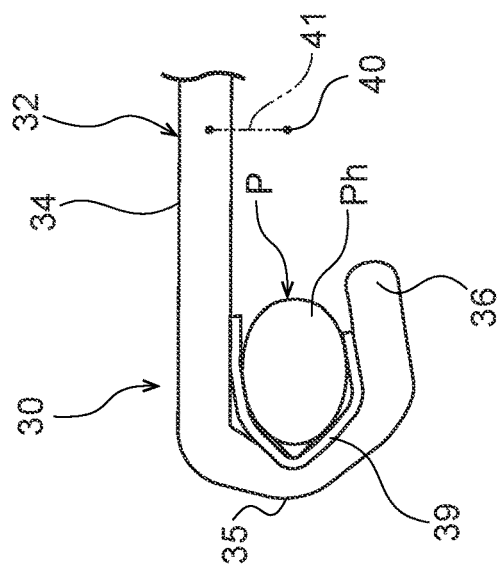
FIG. 8A is a plan view illustrating a passenger head restraining processes by the in-seat airbag device relating to the second embodiment.
Figure 8B:
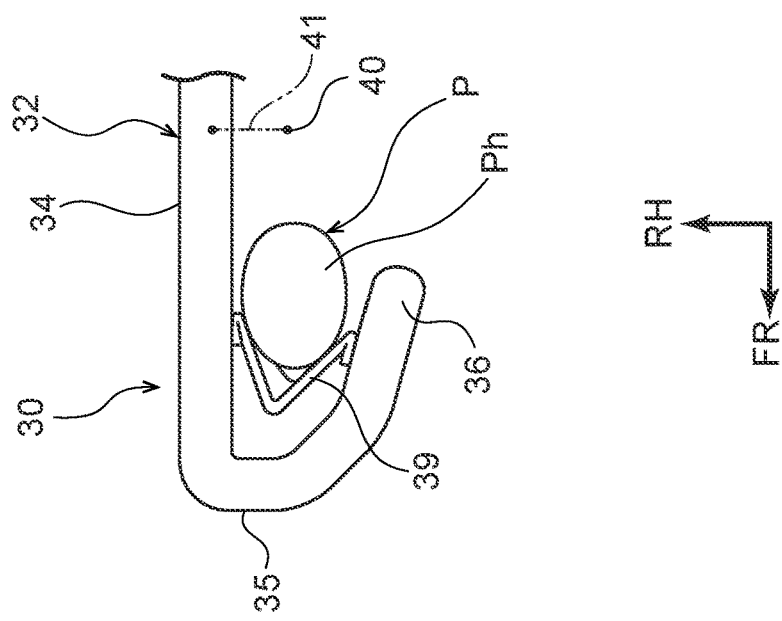
FIG. 8B is a plan view illustrating the passenger head restraining processes by the in-seat airbag device relating to the second embodiment.
Figure 8C:
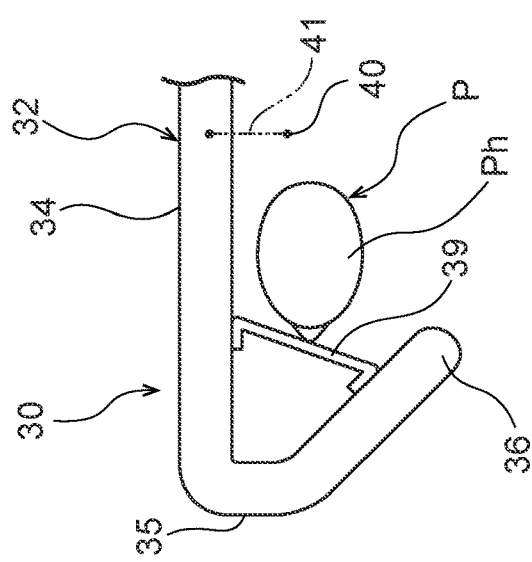
FIG. 8C is a plan view illustrating the passenger head restraining processes by the in-seat airbag device relating to the second embodiment.

In accordance with this surface tether 39 for head restraining, as illustrated in FIG. 8A through FIG. 8C, the head Ph of the passenger P that starts to move toward the front side due to inertia is held as if the surface tether 39 for head restraining is wound thereon. Due thereto, because the distal end chamber 36 is pulled toward the side of the head Ph of the passenger P, the head Ph of the passenger P slipping-out from the airbag main body 32 can be suppressed more effectively.

Further, because the surface tether 39 for head restraining stretches toward the front side, the amount of movement of the head Ph of the passenger P toward the front side is not limited, and the left-right chamber 35 and a portion of the distal end chamber 36 at the left-right chamber 35 side can be crushed in the front-rear direction. Due thereto, an F-S characteristic of a low load and a large stroke is obtained.

Figure 9:
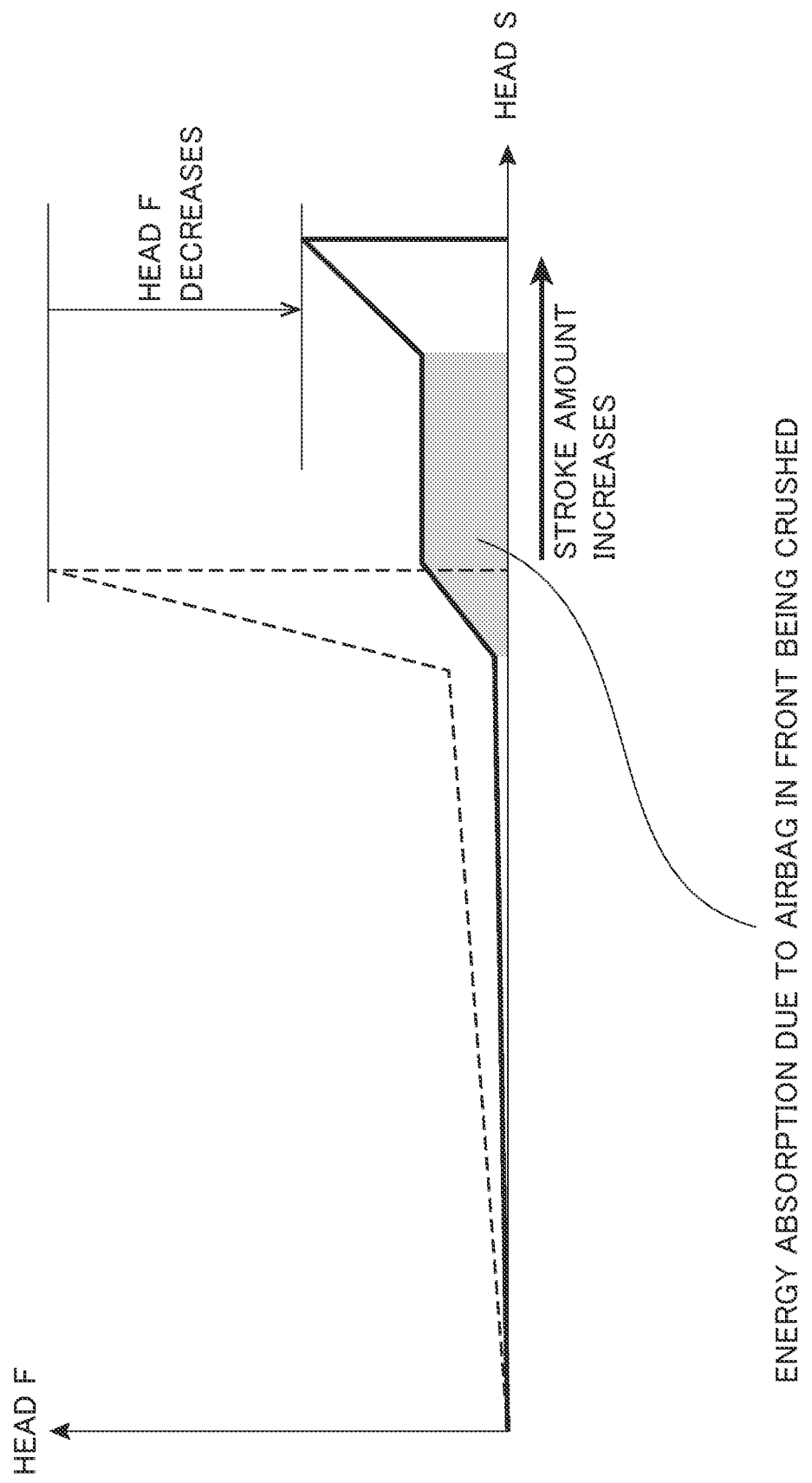
FIG. 9 is a graph illustrating the load-displacement characteristic (F-S characteristic) at a time of restraining the head of the passenger by the in-seat airbag device relating to the second embodiment.

FIG. 9 illustrates this F-S characteristic. As shown by the dashed line in FIG. 9, in a case in which the surface tether 39 for head restraining is not provided, the left-right chamber 35 and a portion of the distal end chamber 36 at the left-right chamber 35 side cannot be crushed in the front-rear direction, and therefore, the load applied to the head Ph of the passenger P increases sharply.

However, as shown by the solid line in FIG. 9, in a case in which the surface tether 39 for head restraining is provided, because the surface tether 39 for head restraining stretches toward the front side, the left-right chamber 35 and a portion of the distal end chamber 36 at the left-right chamber 35 side can be crushed in the front-rear direction, and the load (the energy) applied to the head Ph can be absorbed thereby, and the amount of the stroke toward the front side can be increased. Accordingly, the load that is applied to the head Ph can be reduced as compared with a case in which the surface tether 39 for head restraining is not provided.

Third Embodiment

The airbag device 30 relating to a third embodiment is described next. Note that regions that are equivalent to those of the above-described first embodiment are denoted by the same reference numerals, and detailed description thereof (including description of common operations) is omitted appropriately.

Figure 10:
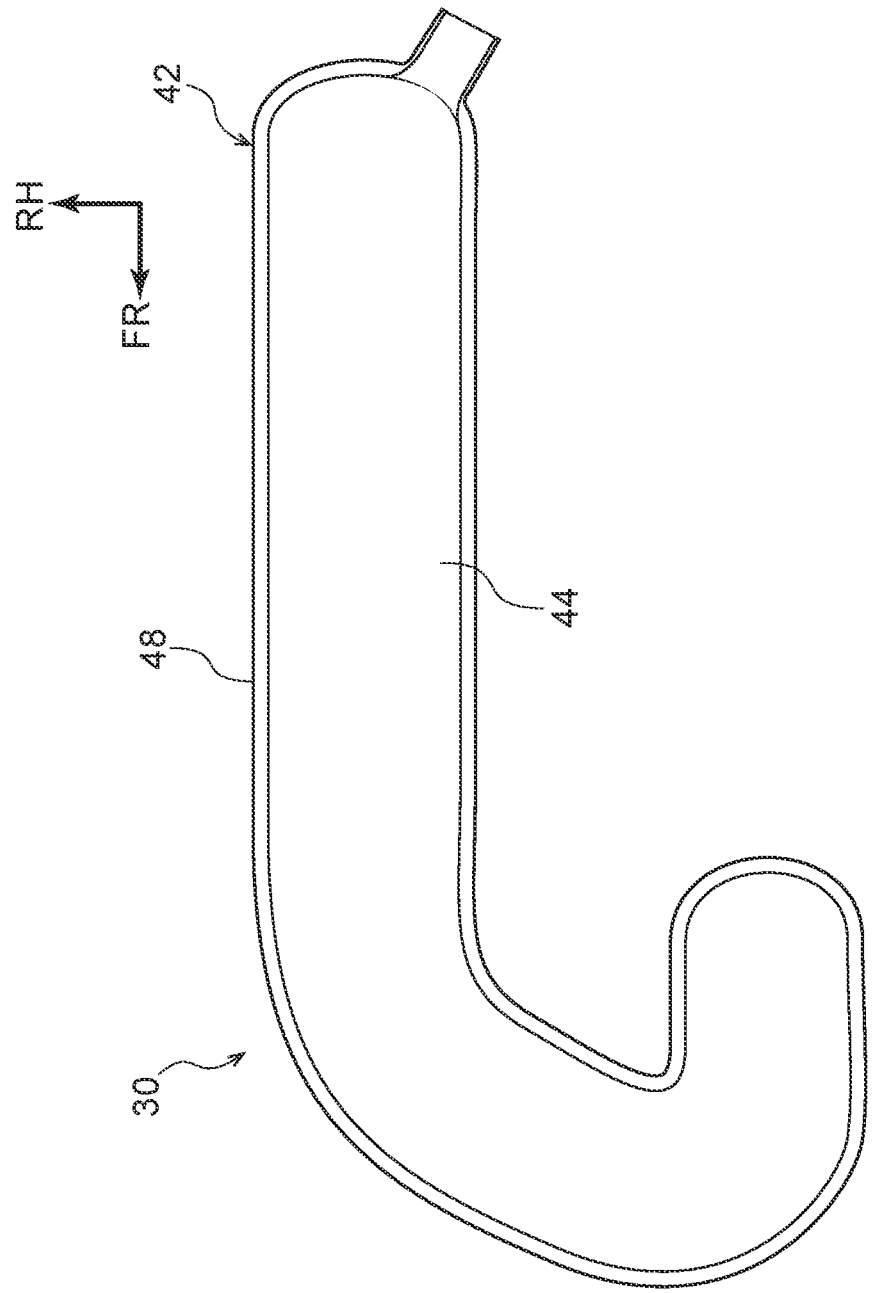
FIG. 10 is a plan view illustrating a state after expansion of an airbag main body of an in-seat airbag device relating to a third embodiment.
Figure 11:
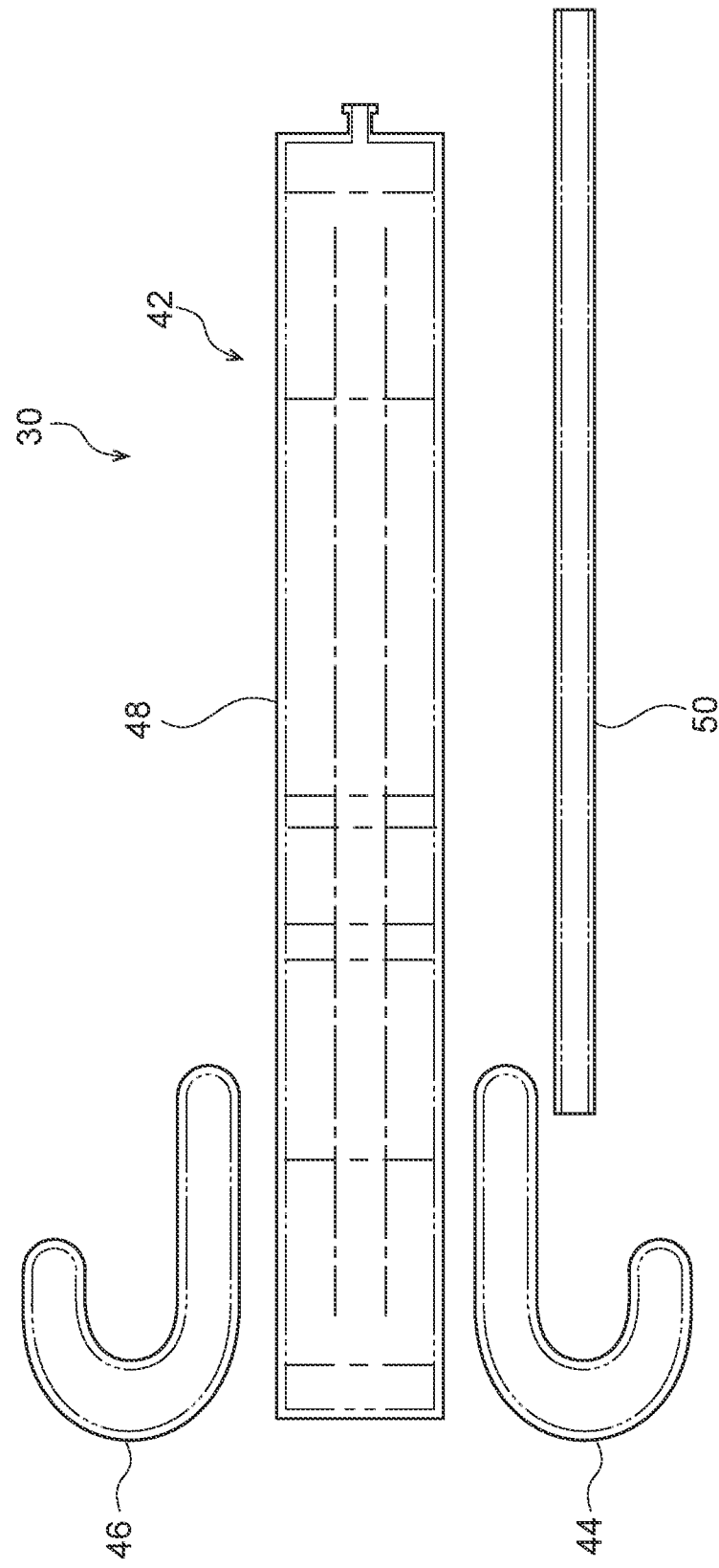
FIG. 11 is an exploded view illustrating the structure of the airbag main body at the in-seat airbag device relating to the third embodiment.

As illustrated in FIG. 10 and FIG. 11, an airbag main body 42 of the airbag device 30 relating to the third embodiment is structured by an upper surface fabric 44 and a lower surface fabric 46 that are formed in substantial "J" shapes as seen in a bottom view, and a side surface fabric 48 whose both end portions in the vertical direction are respectively sewn (sewn three-dimensionally) to the periphery of the upper surface fabric 44 and the periphery of the lower surface fabric 46. Namely, the upper surface tether 37 and the lower surface tether 38 are not provided at the airbag main body 32.

Accordingly, at the time of restraining the head of the passenger P, there is no load that is applied to the neck of the passenger P due to the lower surface tether 38 contacting the neck of the passenger P. Note that a tether 50 (see FIG. 11), which restricts the thickness of the vertical direction central portion of the airbag main body 42 such that the thickness does not become thicker than needed, is provided by sewing at the vertical direction central portion of the interior of the airbag main body 42.

Further, in a case in which the airbag main body 42 expands from the left rear side of the head Ph of the passenger P seated in the vehicle seat 10 toward the front side, the airbag main body 42 is structured by the upper surface fabric 44 and the lower surface fabric 46 that are formed in substantial "J" shapes as seen in plan view, and the side surface fabric 48 whose vertical direction both end portions are respectively sewn (sewn three-dimensionally) to the periphery of the upper surface fabric 44 and the periphery of the lower surface fabric 46.

Fourth Embodiment

Lastly, the airbag device 30 relating to a fourth embodiment is described. Note that regions that are equivalent to those of the above-described first embodiment are denoted by the same reference numerals, and detailed description thereof is omitted appropriately.

Figure 12:
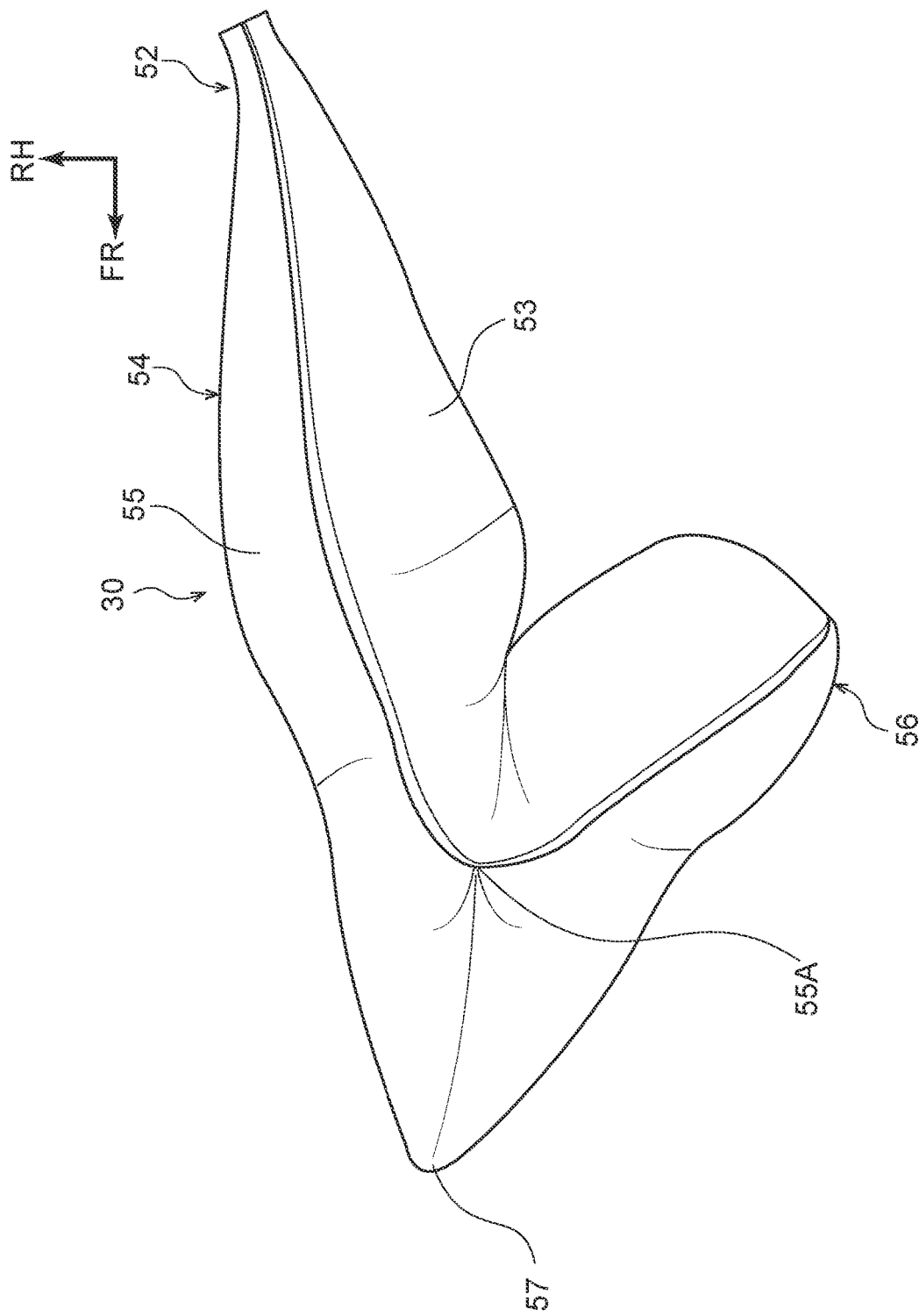
FIG. 12 is a plan view illustrating a state after expansion of an airbag main body of an in-seat airbag device relating to a fourth embodiment.
Figure 13:
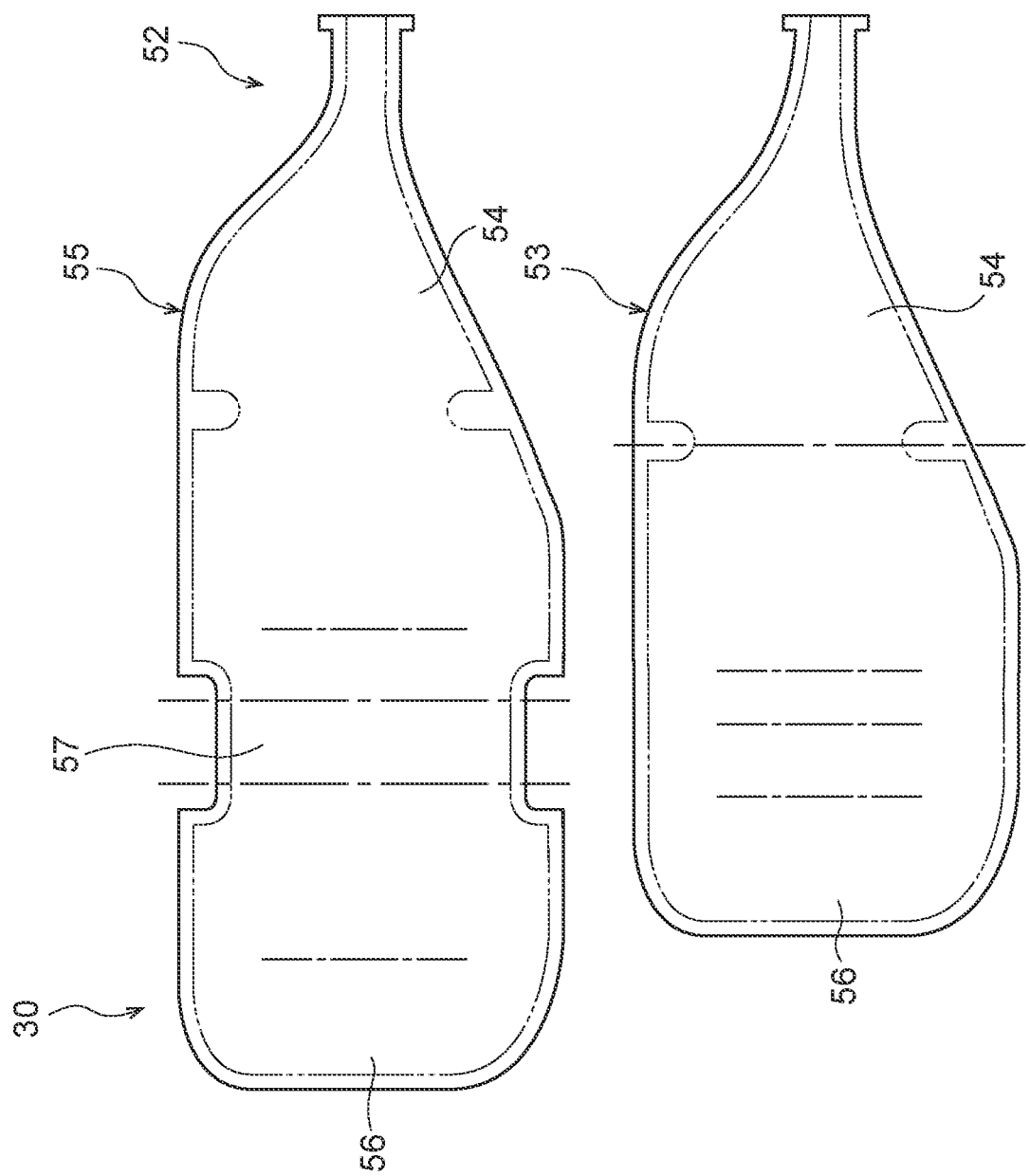
FIG. 13 is an exploded view illustrating the structure of the airbag main body at the in-seat airbag device relating to the fourth embodiment.

As illustrated in FIG. 12 through FIG. 14, an airbag main body 52 of the airbag device 30 relating to the fourth embodiment has a front-rear chamber 54 that expands past the right side (a side) of the head Ph of the passenger P toward the front side and is disposed at the right side of the head Ph of the passenger P (between the head Ph of the passenger P at the side window 18 side and the head of the passenger at the center seat side), and a distal end chamber 56 that extends from the front side end portion of the front-rear chamber 54 toward the seat width direction inner side and is disposed at the front side of the face of the passenger P.

Further, this airbag main body 52 is structured by an inner side chamber 53 that the head Ph of the passenger P contacts, and an outer side chamber 55 whose length in the expansion direction is formed to be longer than that of the inner side chamber 53 and that is provided integrally with the outer side of the inner side chamber 53. Namely, the inner side chamber 53 has the front-rear chamber 54 and the distal end chamber 56, and the outer side chamber 55 also has the front-rear chamber 54 and the distal end chamber 56.

Moreover, a surplus length portion 57 that projects-out toward the front side at the time of expansion is formed at a boundary portion 55A between the front-rear chamber 54 and the distal end chamber 56 at the outer side chamber 55.

Namely, as illustrated in FIG. 14, the airbag main body 52 is structured by, in the state in which the surplus length portion 57 is folded-up, the outer side chamber 55 being superposed on the inner side chamber 53, and the outer peripheral edge portion of the outer side chamber 55, except for this surplus length portion 57, and the outer peripheral edge portion of the inner side chamber 53 being sewn together, and the outer peripheral edge portions of the surplus length portion 57 being sewn together.

Operation of the airbag device 30 relating to the fourth embodiment that is structured as described above is described next. Note that description of operations that are common with those of the above-described first embodiment is omitted appropriately.

When the detecting device detects that the vehicle has front-collided, the inflator 28 operates and jets-out gas. The front-rear chamber 54 expands past the right side of the head Ph of the passenger P toward the front side and is disposed at the right side of the head Ph of the passenger P. The distal end chamber 56 expands from the front side end portion of the front-rear chamber 54 toward the seat width direction inner side and is disposed at the front side of the face of the passenger P.

Here, the airbag main body 52 is structured by the inner side chamber 53 that is contacted by the head Ph of the passenger P, and the outer side chamber 55 whose length in the expansion direction is formed to be longer than that of the inner side chamber 53 and that is provided integrally with the outer side of the inner side chamber 53. Further, the surplus length portion 57 that projects-out toward the front side is formed at the boundary portion 55A between the front-rear chamber 54 and the distal end chamber 56 at the outer side chamber 55.

Accordingly, as compared with a case in which this surplus length portion 57 is not formed, gas can be made to flow smoothly from the front-rear chamber 54 to the distal end chamber 56 of the airbag main body 52. Accordingly, a delay in expansion of the distal end chamber 56 can be suppressed, and the head Ph of the passenger P can be restrained effectively. Further, because the upper surface tether 37 and the lower surface tether 38 are not provided at the airbag main body 52, at the time of restraining the head of the passenger P, there is no load that is applied to the neck of the passenger P due to the lower surface tether 38 contacting the neck of the passenger P.

Although the in-seat airbag devices 30 relating to the present embodiments have been described above on the basis of the drawings, the in-seat airbag devices 30 relating to the present embodiments are not limited to the illustrated structures, and the designs thereof can be changed appropriately within a scope that does not depart from the gist of the present disclosure. For example, the structures of the respective embodiments of the in-seat airbag devices 30 relating to the present embodiments may be combined appropriately.

Further, the joining members 41, which join the supporting point 40 and the rear side end portion 34B of the front-rear chamber 34 at the airbag main body 32, are not limited to a structure of being provided as a pair of upper and lower members, and only one joining member 41 may be provided, provided that there is a structure in which the rear side end portion 34B of the front-rear chamber 34 can be supported appropriately.

What is claimed is:

1. An in-seat airbag device comprising:
   an airbag main body having a front-rear chamber that, due to gas jetted from an inflator that operates due to a collision of a vehicle being detected or predicted, expands past one side of a head of a passenger toward a seat front side and is disposed at the one side of the head of the passenger, a left-right chamber that expands from a seat front side end portion of the front-rear chamber toward a seat width direction inner side and is disposed at a seat front side of a face of the passenger, and a distal end chamber that expands from a seat width direction inner side end portion of the left-right chamber toward a seat rear side and is disposed at another side of the head of the passenger, wherein the airbag main body is structured such that, in a state in which expansion is completed, the left-right chamber has a curved shape as seen in plan view, and wherein, as seen in plan view, a supporting point at a seat side that supports the airbag main body is positioned on an imaginary straight line that passes through a center of gravity of the head of the passenger and runs along a seat front-rear direction.

2. The in-seat airbag device of claim 1, wherein the airbag main body has:

an upper surface tether that joins an expansion direction intermediate portion at an upper end portion of the front-rear chamber and an expansion direction intermediate portion at an upper end portion of the distal end chamber, and that covers an upper portion of a space surrounded by the front-rear chamber, the left-right chamber and the distal end chamber, and a lower surface tether that joins an expansion direction intermediate portion at a lower end portion of the front-rear chamber and an expansion direction intermediate portion at a lower end portion of the distal end chamber, and that covers a lower portion of the space surrounded by the front-rear chamber, the left-right chamber and the distal end chamber, wherein the left-right chamber has a curved shape as seen in plan view in the state in which expansion of the airbag main body is completed, due to the upper surface tether being sewn to the upper end portion of the front-rear chamber, an upper end portion of the left-right chamber and the upper end portion of the distal end chamber, and the lower surface tether being sewn to the lower end portion of the front-rear chamber, a lower end portion of the left-right chamber and the lower end portion of the distal end chamber.

3. The in-seat airbag device of claim 2, wherein, as seen in a bottom view, a seat rear side end portion of the lower surface tether is cut-out such that a surface area of the lower surface tether is smaller than a surface area of the upper surface tether.

4. The in-seat airbag device of claim 2, wherein the lower surface tether is a tether chamber that expands due to gas jetted from the inflator.

5. The in-seat airbag device of claim 1, wherein, as seen in plan view, a boundary portion between the left-right chamber and the distal end chamber is positioned on an imaginary straight line that passes through the center of gravity of the head of the passenger and runs along the seat front-rear direction.

6. The in-seat airbag device of claim 1, comprising a joining member that, as seen in plan view, extends in a seat width direction and joins a seat rear side end portion of the front-rear chamber and the supporting point at the seat side that supports the airbag main body.

7. The in-seat airbag device of claim 6, wherein:

the seat rear side end portion of the front-rear chamber and a jetting port of the inflator are connected by a connecting member, and a length of the connecting member is longer than a length of the joining member.

8. The in-seat airbag device of claim 1, wherein the airbag main body has a surface tether for head restraining that joins a head restraining region at the front-rear chamber and a head restraining region at the distal end chamber, and that is formed of a material that stretches more than a base fabric of the airbag main body.

9. The in-seat airbag device of claim 1, wherein the airbag main body is structured by an upper surface fabric and a lower surface fabric that are formed in substantial "J" shapes as seen in plan view or as seen in a bottom view, and a side surface fabric whose seat vertical direction both end portions are sewn respectively to a periphery of the upper surface fabric and a periphery of the lower surface fabric.

10. An in-seat airbag device comprising:

an airbag main body having a front-rear chamber that, due to gas jetted from an inflator that operates due to a collision of a vehicle being detected or predicted, expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger, wherein:

the airbag main body is structured by an inner side chamber that is contacted by the head of the passenger, and an outer side chamber whose length in an expansion direction is formed to be longer than the inner side chamber and that is provided integrally with an outer side of the inner side chamber, a surplus length portion that projects-out toward a seat front side is formed at a boundary portion between the front-rear chamber and the distal end chamber at the outer side chamber, and as seen in plan view, a supporting point at a seat side that supports the airbag main body is positioned on an imaginary straight line that passes through a center of gravity of the head of the passenger and runs along a seat front-rear direction.

11. The in-seat airbag device of claim 10, comprising a joining member that, as seen in plan view, extends in a seat width direction and joins a seat rear side end portion of the front-rear chamber and the supporting point at the seat side that supports the airbag main body.

12. The in-seat airbag device of claim 11, wherein:

the seat rear side end portion of the front-rear chamber and a jetting port of the inflator are connected by a connecting member, and a length of the connecting member is longer than a length of the joining member.

13. An in-seat airbag device comprising:

an airbag main body having a front-rear chamber that, due to gas jetted from an inflator that operates due to a collision of a vehicle being detected or predicted, expands past one side of a head of a passenger toward a seat front side and is disposed at the one side of the head of the passenger, a left-right chamber that expands from a seat front side end portion of the front-rear chamber toward a seat width direction inner side and is disposed at a seat front side of a face of the passenger, and a distal end chamber that expands from a seat width direction inner side end portion of the left-right chamber toward a seat rear side and is disposed at another side of the head of the passenger, wherein the airbag main body is structured such that, in a state in which expansion is completed, the left-right chamber has a curved shape as seen in plan view, wherein the airbag main body has:
- an upper surface tether that joins an expansion direction intermediate portion at an upper end portion of the front-rear chamber and an expansion direction intermediate portion at an upper end portion of the distal end chamber, and that covers an upper portion of a space surrounded by the front-rear chamber, the left-right chamber and the distal end chamber, and
- a lower surface tether that joins an expansion direction intermediate portion at a lower end portion of the front-rear chamber and an expansion direction intermediate portion at a lower end portion of the distal end chamber, and that covers a lower portion of the space surrounded by the front-rear chamber, the left-right chamber and the distal end chamber, wherein the left-right chamber has a curved shape as seen in plan view in the state in which expansion of the airbag main body is completed, due to the upper surface tether being sewn to the upper end portion of the front-rear chamber, an upper end portion of the left-right chamber and the upper end portion of the distal end chamber, and the lower surface tether being sewn to the lower end portion of the front-rear chamber, a lower end portion of the left-right chamber and the lower end portion of the distal end chamber, and wherein, as seen in a bottom view, a seat rear side end portion of the lower surface tether is cut-out such that a surface area of the lower surface tether is smaller than a surface area of the upper surface tether.

\* \* \* \* \*